(12) United States Patent
Tang et al.

(10) Patent No.: US 12,393,633 B2
(45) Date of Patent: Aug. 19, 2025

(54) FLOW GRAPH CALCULATION AND STORAGE METHOD AND SYSTEM

(71) Applicant: Alipay (Hangzhou) Information Technology Co., Ltd., Zhejiang (CN)

(72) Inventors: Kun Tang, Zhejiang (CN); Peng Yi, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/461,388

(22) Filed: Sep. 5, 2023

(65) Prior Publication Data

US 2024/0078262 A1    Mar. 7, 2024

(30) Foreign Application Priority Data

Sep. 2, 2022  (CN) .......................... 202211070242.9

(51) Int. Cl.
*G06F 16/901*  (2019.01)
*G06F 16/27*   (2019.01)

(52) U.S. Cl.
CPC .......... *G06F 16/9024* (2019.01); *G06F 16/27* (2019.01)

(58) Field of Classification Search
CPC .............................. G06F 16/9024; G06F 16/27
USPC ........................................................ 707/798
See application file for complete search history.

(56) References Cited

U.S. PATENT DOCUMENTS

| | | | |
|---|---|---|---|
| 11,514,534 B1 * | 11/2022 | Ying | G06Q 20/38 |
| 11,614,332 B2 * | 3/2023 | Dasler | G01C 21/206 |
| | | | 701/428 |
| 2009/0249004 A1 * | 10/2009 | Wang | G06F 16/9574 |
| | | | 711/E12.103 |
| 2012/0179726 A1 * | 7/2012 | Roberts | G06F 11/3604 |
| | | | 707/E17.011 |
| 2013/0205286 A1 * | 8/2013 | Barraclough | G06F 9/45516 |
| | | | 717/151 |
| 2015/0350324 A1 * | 12/2015 | Hu | H04L 67/1097 |
| | | | 709/219 |
| 2017/0124454 A1 * | 5/2017 | Vasudevan | G06N 3/084 |
| 2018/0308039 A1 * | 10/2018 | Nemati | G06Q 30/0202 |
| 2019/0012162 A1 * | 1/2019 | Vaikar | G06F 9/455 |

(Continued)

FOREIGN PATENT DOCUMENTS

| | | | | |
|---|---|---|---|---|
| CN | 111046246 A | * | 4/2020 | ......... G06F 16/9024 |
| CN | 111177486 B | * | 9/2020 | |

(Continued)

*Primary Examiner* — Phuong Thao Cao
(74) *Attorney, Agent, or Firm* — Seed IP Law Group LLP

(57) ABSTRACT

The present specification relates to the field of digital information, and in particular, to a flow graph calculation and storage method and system. A flow graph includes nodes and edges, and the method includes one or more rounds of processing respectively corresponding to one or more time periods. A round of processing includes: obtaining a graph data segment of a current subgraph based on newly added flow information in a current time period and storing the graph data segment, so as to implement distributed storage of the current subgraph in collaboration with another calculation unit; and for a node in the graph data segment of the current subgraph, obtaining a flow message of data corresponding to an ingress edge of the node from a source node on the ingress edge and storing the flow message, where the flow message includes a source link of the data.

20 Claims, 3 Drawing Sheets

(56) References Cited

U.S. PATENT DOCUMENTS

| | | | | |
|---|---|---|---|---|
| 2020/0211035 A1* | 7/2020 | Bluming | ............ | G06Q 10/0635 |
| 2021/0152443 A1* | 5/2021 | Yadav | ................. | G06F 9/45558 |
| 2021/0160157 A1* | 5/2021 | Yadav | ................. | G06F 3/04842 |
| 2022/0385499 A1* | 12/2022 | Doney | ................ | H04L 12/4633 |
| 2023/0252491 A1* | 8/2023 | Shi | ..................... | G06Q 30/0185 |
| | | | | 705/318 |
| 2023/0334096 A1* | 10/2023 | Wang | ......................... | G06T 1/60 |
| 2024/0054496 A1* | 2/2024 | Huang | ............... | G06Q 20/4014 |

FOREIGN PATENT DOCUMENTS

| | | | | | |
|---|---|---|---|---|---|
| CN | 111782888 | A | * | 10/2020 | |
| CN | 112445940 | A | * | 3/2021 | ......... G06F 16/9024 |
| CN | 112699134 | A | * | 4/2021 | |
| CN | 113434737 | A | * | 9/2021 | ....... G06F 16/24568 |
| CN | 113869591 | A | * | 12/2021 | |
| CN | 115408471 | A | * | 11/2022 | ............. G06F 16/27 |
| EP | 2950507 | A1 | * | 12/2015 | ............... G06F 11/30 |
| EP | 3079077 | A1 | * | 10/2016 | ....... G06F 17/30486 |
| EP | 2919132 | A1 | * | 5/2019 | ......... G06F 11/3604 |
| JP | 2004007466 | A | * | 1/2004 | ................ H04L 1/24 |
| KR | 20190124512 | A | * | 11/2019 | ............. G06F 16/13 |
| WO | WO-2023048747 | A1 | * | 3/2023 | .......... G06F 11/3003 |

\* cited by examiner

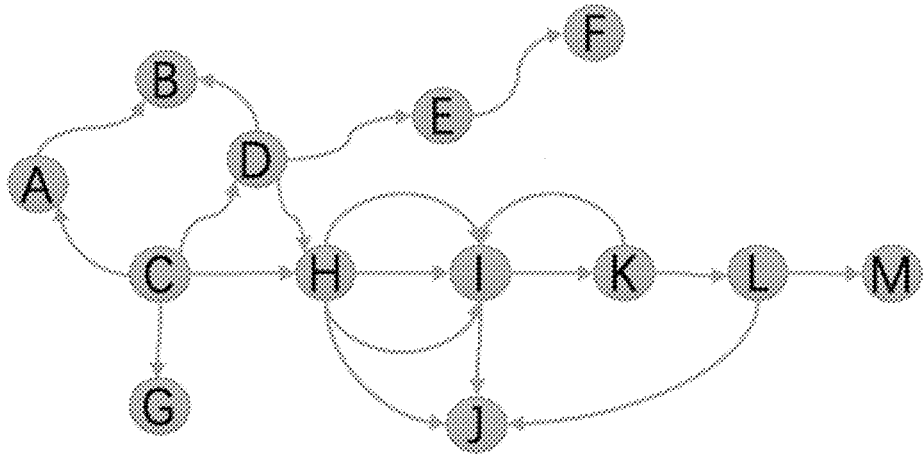

Obtain a graph data segment of a current subgraph based on newly added flow information in a current time period and store the graph data segment, so as to implement distributed storage of the current subgraph in collaboration with another calculation unit
210

For a node in the graph data segment of the current subgraph, obtain a flow message of data corresponding to an ingress edge of the node from a source node on the ingress edge and store the flow message
220

For a node in the graph data segment of the current subgraph, generate a flow message of the node based on an egress edge of the node
230

FIG. 2

FLOW GRAPH CALCULATION AND STORAGE METHOD AND SYSTEM

TECHNICAL FIELD

The present specification relates to the field of digital information, and in particular, to a flow graph calculation and storage method and system.

BACKGROUND

In daily life and production, data flow scenarios often occur, for example, goods transportation between different warehouses, travel itinerary of users in travel between different places, and resource flow between different resource accounts. As data flows, a flow track and flow information are generated.

SUMMARY

An implementation of the present specification provides a flow graph calculation and storage method. The flow graph includes nodes and edges, a data flow exists between the nodes, and the edges are used to indicate a flow direction of data between the nodes. The method is performed by a calculation unit of a plurality of calculation units configured to store the flow graph in a distributed manner, and includes one or more rounds of processing respectively corresponding to one or more time periods. A round of processing includes: obtaining a graph data segment of a current subgraph based on newly added flow information in a current time period and storing the graph data segment, so as to implement distributed storage of the current subgraph in collaboration with another calculation unit; and for a node in the graph data segment of the current subgraph, obtaining a flow message of data corresponding to an ingress edge of the node from a source node on the ingress edge and storing the flow message, where the flow message includes a source link of the data.

An implementation of the present specification provides a flow graph calculation and storage system. The flow graph includes nodes and edges, a data flow exists between the nodes, and the edges are used to indicate a flow direction of data between the nodes. The system is deployed in a calculation unit of a plurality of calculation units configured to store the flow graph in a distributed manner, so as to perform one or more rounds of processing respectively corresponding to one or more time periods. The system includes: a graph storage module, configured to: in a round of processing, obtain a graph data segment of a current subgraph based on newly added flow information in a current time period and store the graph data segment, so as to implement distributed storage of the current subgraph in collaboration with another calculation unit; and a graph calculation module, configured to: in a round of processing, for a node in the graph data segment of the current subgraph, obtain a flow message of data corresponding to an ingress edge of the node from a source node on the ingress edge and store the flow message, where the flow message includes a source link of the data.

An implementation of the present specification provides a flow graph calculation and storage apparatus, including a processor. The processor is configured to perform the above flow graph calculation and storage method.

BRIEF DESCRIPTION OF DRAWINGS

The present specification is further described by using example implementations, and theses example implementations are described in detail with reference to the accompanying drawings. These implementations are not intended for limitation. In these implementations, same numbers represent same structures.

FIG. 1 is a schematic diagram illustrating a flow graph according to some implementations of the present specification;

FIG. 2 is an example flowchart illustrating a flow graph calculation and storage method according to some implementations of the present specification;

DESCRIPTION OF EMBODIMENTS

Figure 3:
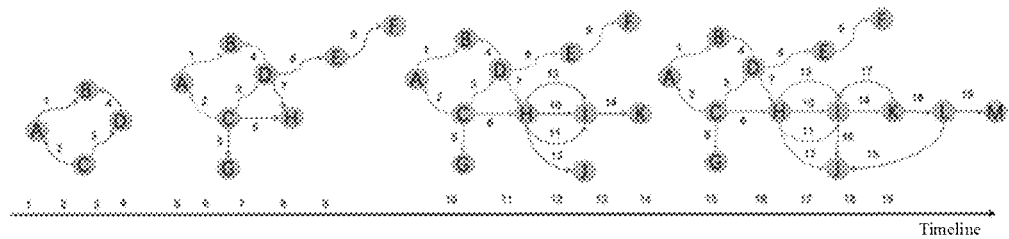
FIG. 3 is a schematic diagram illustrating a change in a flow graph with time according to some implementations of the present specification.

To describe the technical solutions in the implementations of the present specification more clearly, the following is a brief introduction of the accompanying drawings for illustrating such technical solutions. Clearly, the accompanying drawings described below are some examples or implementations of the present specification, and a person of ordinary skill in the art can further apply the present specification to other similar scenarios based on these accompanying drawings without making innovative efforts. Unless clearly learned from the language environment or otherwise stated, same numbers in the drawings represent same structures or operations.

It should be understood that the "system", "apparatus", "unit", and/or "module" used herein are methods used to distinguish between different components, elements, devices, parts, or assemblies of different levels. However, if other words can achieve the same purpose, the words can be replaced by other expressions.

As shown in the present specification and the claims, unless an exception is explicitly indicated in the context, the words "one", "a", "an", and/or "the" do not for example indicate singular numbers and can also include plural numbers. Generally, the terms "include" and "comprise" only indicate steps and elements that have been explicitly identified, and these steps and elements do not constitute an exclusive listing, and the method or the device can also include other steps or elements.

A flowchart is used in the present specification to describe operations performed by the system in the implementations of the present specification. It should be understood that a previous or subsequent operation is not necessarily performed precisely in an order. Instead, steps can be processed in a reverse order or processed simultaneously. In addition, other operations can be added to these processes, or one operation or several operations can be removed from these processes.

In daily life and production, data flow scenarios often occur, for example, a resource flow between different resource accounts, goods transportation between different warehouses, and travel migration of users in travel between different places. A large amount of flow data is generated in these scenarios. In some implementations, a flow graph can be generated based on the flow data. A data flow exists between nodes in the flow graph, and an edge between the nodes reflects a flow direction of data between the nodes.

FIG. 1 is a schematic diagram illustrating a flow graph according to some implementations of the present specification.

As shown in FIG. 1, the illustrated flow graph is a flow graph 100 formed by information generated in a process in which data flows between nodes. For example, the data can be logistic data of transportation of goods, and logistic event of different times and/or routes correspond to different data. A node corresponds to location used by a user for, e.g., storage, in the logistic process of transportation of the goods, and an edge between nodes reflects a transportation direction of goods between nodes. In some implementations, the edges can further reflect an amount of goods transported between the nodes. The locations can be, for example, locations used for storing the goods. In some implementations, the same user can have different nodes corresponding to different locations in the logistic process of the goods. For example, a user simultaneously can be a seller, a transportation carrier, a regional distributor, etc., which has different functions and locations in a logistic process of the involved goods. For example, nodes A, B, C, and D in FIG. 1 can be different logistic nodes of user X. It can be learned that the flow graph can further reflect information about a logistics of goods between/among different locations of the same user.

The illustrated flow graph 100 is formed by information generated in a process in which data flows between nodes. In some implementations, the data can be resource (e.g., goods, services, funds) data, and resources of different amounts correspond to different data. A node corresponds to an account used for resource storage, and an edge between nodes reflects a flow direction of a resource between nodes. In some implementations, the edge can further reflect an amount of a resource flowing between the nodes. The account can be, for example, an account used for resource storage, such as resource accounts of different users. In some implementations, the same user can further have different types of resource accounts, for example, a user simultaneously has a bank account, a financial account, and a securities account. Different types of resource accounts of the same user can also correspond to different nodes in a resource flow graph. For example, nodes A, B, C, and D in FIG. 1 can be different resource accounts of user X. It can be learned that the resource flow graph can further reflect information about a flow of a resource between different resource accounts of the same user.

When resources are transferred from one node to another node, an edge is generated. In some implementations, information that is about a data flow between nodes and that is reflected by an edge can have a flow direction. The resource flow graph 100 is still used as an example. For example, user X purchases a commodity in a supermarket and pays an amount of the commodity by using a bank account, and a bank account of the supermarket receives the amount of the commodity. Correspondingly, in the resource flow graph, node D corresponding to the bank account of user X and node E corresponding to the bank account of the supermarket exist, and an edge that points from node D of the bank account of user X to node E of the bank account of the supermarket exist.

In some implementations, information that is about a resource flow and that is reflected by an edge can further include a flow scenario (such as a purchase scenario, a borrowing scenario, or a subscription scenario) and flow time in a flow process. The flow information can be set based on an actual requirement. For example, in some implementations, the flow information can further include flow details. For example, in the resource flow graph 100, the edge that points from node D of the bank account of user X to node E of the bank account of the supermarket can include a commodity list of the transaction. In some implementations, there are possibly a plurality of different edges between same nodes, and these edges can relate to different flow data, different flow time, etc. For example, in FIG. 1, an edge corresponding to a transfer of 3000 pieces of resources on Apr. 20, 2021, an edge corresponding to a transfer of 2000 pieces of resources on Apr. 21, 2021, and an edge corresponding to a transfer of 2500 pieces of resources on May 2, 2021 can exist between node H of a bank account of user Y and node I of a securities account of user Y.

In an example application scenario of the resource flow graph, a sequential flow path of each resource in the flow graph can be calculated, so that a user intention can be completely and clearly understood, and corresponding applications such as logistic path optimization, resource manufacturing and storage optimization, resource risk and security guarantee are performed based on the user intention, which has a large service value.

It should be noted that, in some implementations, data in a data flow graph can also be information related to a person, a cargo, a vehicle, etc. (such as an identity, a cargo code, or license plate information), so as to indicate flow information of the person, the cargo, or the vehicle. For example, when the data is cargo-related information, a node in the data flow graph can correspond to a location or a tool that can accommodate the cargo, for example, a warehouse or a transportation tool, and the flow information (that is, an edge between nodes) can be a number of transferred cargos, a flow direction and time, etc. Flow data in different scenarios is stored and analyzed, so that valuable information in different service fields can be obtained, to guide people's life and production activities.

In some implementations, as time goes by, there is possibly an increase in the number of nodes (for example, an increase in users and accounts of the user) and more flow information is possibly recorded, which causes an increase in a volume of the graph. Therefore, to address this technical problem, the flow graph is stored in a distributed manner in some implementations, that is, the flow graph is split into a plurality of subgraphs, which are respectively stored by a plurality of calculation devices (or calculation units).

In some example application scenarios, the volume of the flow graph increases rapidly with time, a time span corresponding to the flow graph is also long (for example, more than two natural months), and a depth or a number of involved nodes of a data flow is also large. In this application scenario, a great challenge is posed to calculation and storage of a large-scale sequential flow graph. A general distributed storage solution has obvious disadvantages in terms of device size, resource configuration, calculation unit bottleneck, and consumed calculation time, resulting in an increased difficulty in analyzing and tracing flow data. Therefore, in some implementations of the present specification, a flow graph calculation and storage method is provided. A flow graph with a large volume is divided into a plurality of subgraphs based on a time period and the subgraphs are stored in a distributed manner, and source information of data is retained in a high time-efficient manner by using a flow message in a process of storing the subgraphs. The storage method provided in some implementations of the present specification can stably implement data storage expansion in a case of fast growth of a flow graph scale. A calculation method related to the flow message lays a data foundation for data tracing, thereby effectively improving efficiency of subsequent graph calculation such as data flow path analysis and user intention analysis.

FIG. 2 is an example flowchart illustrating a flow graph calculation and storage method according to some implementations of the present specification.

Before the procedure shown in FIG. 2 is described, an amplification process of a flow graph is first described.

Figure 4:
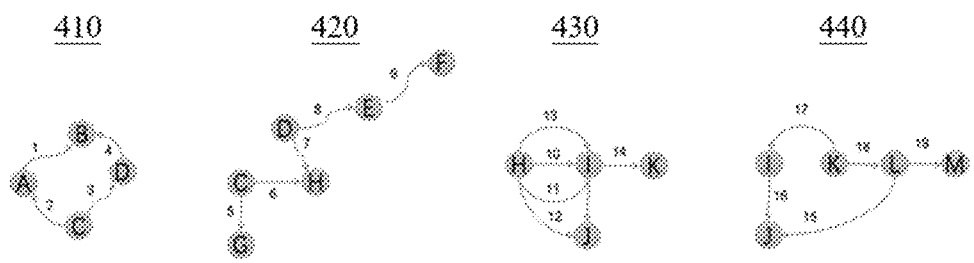
FIG. 4 is a schematic diagram illustrating division of a flow graph into a plurality of subgraphs according to some implementations of the present specification.

FIG. 3 is a schematic diagram illustrating a change in a flow graph with time according to some implementations of the present specification. FIG. 4 is a schematic diagram illustrating division of a flow graph into a plurality of subgraphs according to some implementations of the present specification.

The previous example continues to be used. If the resource flow graph 100 includes resource flow information in four days, as shown in FIG. 3, resource flow graphs of the first day to the fourth day can be obtained based on a time sequence of resource flows. In some implementations, a number can be added to the edge in the resource flow graph 100 in a sequence of flow generation (that is, edge generation) in the flow graph. For example, in the graph, a transfer corresponding to edge 2 occurs after edge 1 and before edge 3. For another example, when the second day ends, the graph includes transactions (edges 1 to 4) that have been completed in the first day and transactions (edge 5 to edge 9) that have occurred in the current day. It can be learned that a flow graph corresponding to the second day includes nine edges, that is, records nine pieces of flow data. In the fourth day, a flow graph of all flow data (19 edges in total) is recorded, which can be equivalent to the resource flow graph 100.

In some implementations, time of the data flow can be divided into a plurality time periods, and flow data newly added in each period forms a subgraph. In some implementations, the time period can be a fixed period of time, such as 12 hours, one day, two days, one week, or one month. The resource flow graph 100 is still used as an example, and includes flow data in four days. The time period can be set to one day. In this case, four time periods can be obtained through division, and subgraphs corresponding to the four time periods are generated. Each subgraph includes only all flow data in a time period corresponding to the subgraph. When a current time period is not a first time period, the flow data can be considered as incremental data in a time period. Therefore, in some implementations, the subgraph can also be referred to as an incremental (data) graph.

As shown in FIG. 4, flow data from the first day to the fourth day respectively corresponds to a first subgraph 410, a second subgraph 420, a third subgraph 430, and a fourth subgraph 440 from left to right in the figure. The second subgraph 420, the third subgraph 430, and the fourth subgraph 440 each can be considered as an incremental graph of a previous subgraph. For example, it can be learned from FIG. 3 that a transfer occurred in the second day includes a resource flow corresponding to edge 5 to edge 9. Therefore, the second subgraph 420 corresponding to the second day in FIG. 4 includes only edge 5 to edge 9.

In some implementations, one or more steps in a procedure 200 of a flow graph calculation and storage method shown in FIG. 2 can be performed by a calculation unit of a plurality of calculation units participating in distributed storage of a flow graph, and the procedure includes one or more rounds of processing respectively corresponding to one or more time periods. FIG. 4 is used as an example. The figure includes four time periods, that is, the four time periods respectively correspond to four rounds of processing. A round of processing includes the following steps.

Step 210: Obtain a graph data segment of a current subgraph based on newly added flow information in a current time period and store the graph data segment, so as to implement distributed storage of the current subgraph in collaboration with another calculation unit. In some implementations, step 210 can be performed by a subgraph storage module 810.

In some implementations, the graph data segment of the current subgraph is one or more of data segments obtained by splitting a subgraph corresponding to the current round for distributed storage. In some implementations, a sum of graph data fragments held by all calculation units is the current subgraph. It should be noted that a number of graph data fragments of the subgraph can be the same as or different from a number of calculation units. Further, the graph data fragments may partially overlap with one another. Also, it is possible that two or more calculation units store a same graph data fragment.

Figure 6:
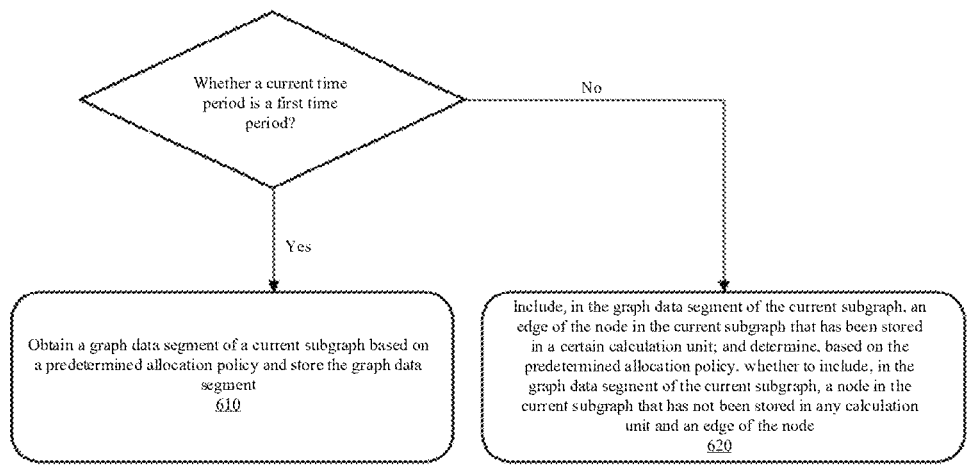
FIG. 6 is an example flowchart illustrating distributed storage of a subgraph according to some implementations of the present specification.
Figure 7:
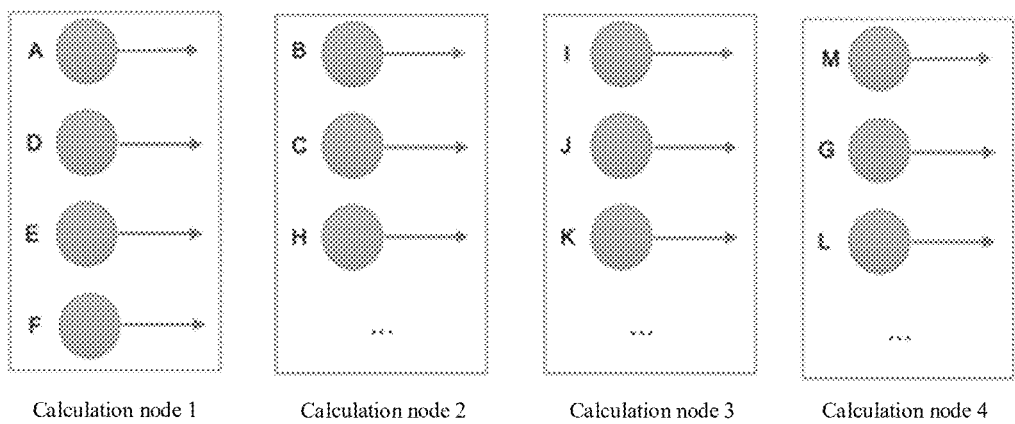
FIG. 7 is a schematic diagram illustrating a resource flow graph obtained after distributed storage according to some implementations of the present specification.

In some implementations, for a form of a flow graph obtained after distributed storage, references can be made to FIG. 7. For a specific storage process, references can be made to related descriptions in the following FIG. 6.

Step 220: For a node in the graph data segment of the current subgraph, obtain a flow message of data corresponding to an ingress edge of the node from a source node on the ingress edge and store the flow message, where the flow message includes a source link of the data. In some implementations, step 220 can be performed by a graph calculation module 820.

In some scenarios, a data scale of a large-scale sequential flow graph is huge, and a depth (for example, a number of nodes through which a resource flows) of a data flow is large. Therefore, it is difficult and time-consuming to identify a flow path of data based on the graph data segment. Therefore, in some implementations of the present specification, in addition to storing a corresponding subgraph in each time period, a flow message of data received by each node is further recorded. The flow message includes a source link of the data. In some implementations, for a node in the graph data segment, a flow message of data corresponding to an ingress edge of the node can be received from a source node on the ingress edge based on the ingress edge. For the node, an edge pointing to the node is the ingress edge, and the other node on the edge is the source node. In contrast, the node can be referred to as a destination node. When the data corresponding to the ingress edge enters the flow graph from the source node for the first time, the source link of the data includes only the source node. Otherwise, the source link of the data includes the source node (that is, a previous node) and a node previous to the previous node until the data enters a first node of the graph. For example, a source link of a resource stored in an account of node I can be C-D-H-I.

In some implementations, a node can store a flow message of data corresponding to each ingress edge of the node. In some implementations, the flow message can further include a value of the flow data. For example, a flow message in a resource flow graph can include a resource amount, and is denoted as: 500 pieces of resources and C-D-H-I. In some implementations, as described above, the flow message can further include other information such as a flow scenario and flow time. For example, the flow message can be denoted as: consumed 500 pieces of resources, C-D-H-I, and 20210504. It should be noted that the above method for recording the flow message and the source link is merely an example. When this solution is actually executed, any other form can be used.

In some implementations, after the node in the graph data segment receives the corresponding flow message from the source node on each ingress edge and stores the corresponding flow message, each ingress edge can be marked as "processed". For example, an attribute field can be added to the ingress edge, and a value of the attribute field can be set to 0, so as to identify that the flow information of the data corresponding to the ingress edge has been recorded.

Figure 5:
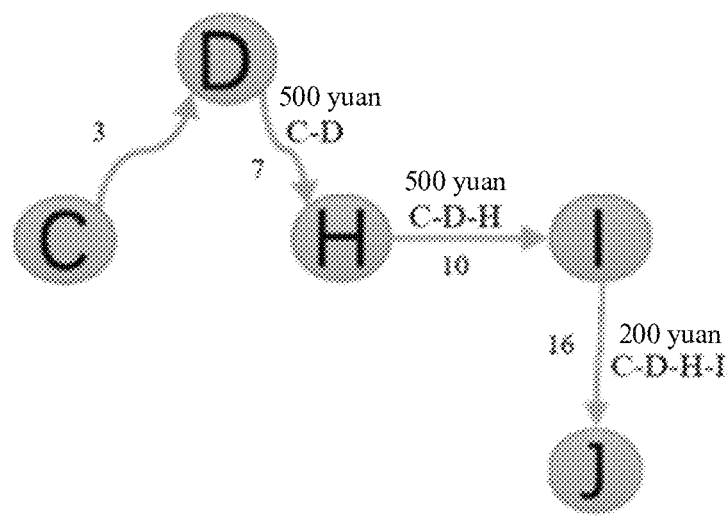
FIG. 5 is a schematic diagram illustrating a data source link according to some implementations of the present specification.

FIG. 5 is a schematic diagram illustrating a data source link according to some implementations of the present specification.

In some implementations, the data source link recorded in FIG. 5 can be a part of data in the resource flow graph 100. As shown in FIG. 5, edge 10 reflects that a resource with an amount of 500 pieces of resources flows from node I to node H. For node I, the source node H of the ingress edge 10 records a source link (for example, C-D-H) of the transacted resource, and node I can obtain, from the source node H of edge 10, a flow message (for example, 500 and C-D-H) of the source link that includes the resource corresponding to edge 10 and store the flow message.

In some implementations, calculation of graph data further includes updating, based on an egress edge, the flow message stored by the node in the graph data segment. Therefore, the procedure 200 further includes the following step.

Step 230: For a node in the graph data segment of the current subgraph, update a flow message of the node based on an egress edge of the node, where the updating further includes modifying data corresponding to one or more flow messages in the node, or deleting one or more flow messages in the node. In some implementations, step 230 can be performed by an egress edge update module. In some implementations, step 230 can be performed by a graph calculation module 820.

In some implementations, data flowing to any node possibly need to continue to flow out, and therefore a flow message of the node needs to be updated based on an egress edge of the node. In some implementations, all or a part of the data possibly flow out, and therefore updating the flow message of the node includes modifying the data corresponding to the flow message.

In some implementations, the modifying the data corresponding to the one or more flow messages in the node includes: decreasing an amount of data corresponding to the one or more flow messages in the node.

The example shown in FIG. 5 continues to be used. It is assumed that node I transfers 200 pieces of resources to node J in a next time period. In this case, the account of node I in the flow graph holds the resource of 500 pieces of resources and stores the flow message (500 pieces of resources and C-D-H-I). In addition, node J and edge 16 are newly added to the flow graph. Calculation is performed based on a subgraph in the next time period, and node I modifies the flow message to the following: 300 pieces of resources and C-D-H-I. If a transfer amount is 500 pieces of resources, node I can modify the data corresponding to the flow message to 0 pieces of resources or directly delete the flow message.

In some implementations, data flowing out from a node is possibly greater than data corresponding to one or more flow messages. In this case, the plurality of flow messages need to be updated or deleted. It should be noted that, for example, in a scenario such as a resource flow, a flow message corresponding to a transferred resource is possibly unable to be accurately determined. Therefore, in some implementations, a flow message can be randomly selected from existing flow messages in the node and is modified or deleted. In some implementations, the flow message can be modified or deleted based on a determined (predetermined or dynamically determined) update policy. For example, during transferring, a flow message corresponding to a maximum amount can be modified or deleted first, or flow messages with closest time can be modified or deleted first.

For example, it is assumed that the account of node I holds a resource of 500 pieces of resources (300 pieces of resources and C-D-H-I, and 200 pieces of resources and C-H-I). If 400 pieces of resources is transferred to an account of node J, the flow message "300 pieces of resources and C-D-H-I" can be deleted (or the corresponding data is modified to 0), and the flow message "200 pieces of resources and C-H-I" can be modified to "100 pieces of resources and C-H-I".

In some implementations, when data is forwarded, a node can generate a flow message of data corresponding to an egress edge of the node based on the egress edge, so that a destination node on the egress edge obtains the flow message corresponding to the egress edge. In some implementations, this step can be performed by the graph calculation module 820. The example in FIG. 5 continues to be used. An account of node H generates a flow message (500 pieces of resources and C-D-H) of corresponding data based on the egress edge 10 of node H, so that a destination node, namely, node I, on the egress edge obtains the flow message.

In some implementations, a flow message including a source link of data is updated for a node of a subgraph corresponding to each time period, so that information generated in a flow process is completely retained and an initial resource state can be traced. In some implementations, flow data recorded by a node in the flow graph can be directly obtained based on an actual service requirement, so as to analyze or further calculate a complete flow path of data that uses the node as an end point, thereby improving calculation efficiency.

FIG. 6 is an example flowchart illustrating distributed storage of a subgraph according to some implementations of the present specification. FIG. 7 is a schematic diagram illustrating a resource flow graph obtained after distributed storage according to some implementations of the present specification.

In some implementations, for the resource flow graph 100, it is assumed that there are four calculation units used for distributed storage. A form of the resource flow graph 100 obtained after distributed storage can be shown in FIG. 7.

In some implementations, a scale of a subgraph corresponding to a time period is possibly still large, and the subgraph needs to be stored in a distributed manner. In some implementations, the subgraph can be divided into a plurality of graph data segments through edge splitting, and then the plurality of graph data segments are stored in a distributed manner. Therefore, the graph data segment stored in the calculation unit includes a part of nodes of the current subgraph and edges of the part of nodes. For example, for the first subgraph 410 in FIG. 4, if node A and node B in the graph respectively correspond to two different calculation units in a distributed storage process (as shown in FIG. 7, the two nodes respectively belong to calculation node 1 and calculation node 2), graph data segments stored in the two calculation units respectively include edges of node A (an ingress edge pointing from node C to node A and an egress edge pointing from node A to node B) and edges of node B (an ingress edge pointing from node A to node B and an ingress edge point from node D to node B). In other words, a distributed storage manner based on edge splitting results in redundant storage of some edges (for example, edge 1 pointing from node A to node B).

In some implementations, to ensure association between graph data fragments in the calculation units, a subgraph corresponding to a first time period and a subgraph (incremental graph) corresponding to a subsequent time period can correspond to different distributed storage manners. Therefore, step 210 can further include the following steps.

Step 610: In response to that the current time period is the first time period, obtain the graph data segment of the current subgraph based on a determined (predetermined or dynamically determined) allocation policy and store the graph data segment.

In some implementations, the subgraph corresponding to the first time period includes an initial state existing when data enters the graph, such as the first subgraph 410. In some implementations, the determined allocation policy can include a balanced allocation policy, a hash modulo policy, etc. For example, the balanced allocation policy includes sending one node and an edge of the node to one calculation unit at a time, to sequentially distribute a plurality of nodes and edges of the nodes to a plurality of calculation units. If a number of nodes is greater than a number of calculation units, the above allocation operation is repeatedly performed on remaining nodes until all the nodes are distributed to the calculation units. The hash modulo policy includes performing a hash operation on an ID of the node and then performing a modulo operation to obtain a calculation unit corresponding to the node, and storing the node and an edge of the node on the calculation unit. In some implementations, the determined allocation policy can alternatively be a common policy in another distributed storage scenario. It should be noted that in a flow graph storage process, storage of a node and an edge refers to storage of instance data corresponding to the node and the edge.

Step 620: In response to that the current time period is not the first time period, include, in the graph data segment of the current subgraph, an edge of the node in the current subgraph that has been stored in the calculation unit; and determine, based on the determined allocation policy, whether to include, in the graph data segment of the current subgraph, a node in the current subgraph that has not been stored in any calculation unit and an edge of the node.

For a subgraph that does not correspond to the first time period, a part of nodes in the graph possibly have been stored in a calculation unit in a previous subgraph storage process. To retain associated information in graph data, in some implementations, the edge of the node in the current subgraph that has been stored in the calculation unit can be included in the graph data segment of the current subgraph. The second subgraph 420 in FIG. 4 is used as an example, node C has been allocated to a calculation unit (calculation unit 2 in FIG. 7) in a storage process of the first subgraph, and therefore an edge of node C included in the second subgraph 420 is also allocated to a graph data segment that is of the second subgraph 420 and that is stored in the calculation unit.

In some implementations, for a node that does not appear in a previous subgraph, the node is allocated based on the determined allocation policy. To be specific, it is determined, based on the determined allocation policy, whether to include, in the graph data segment of the current subgraph, a node in the current graph that has not been stored in any calculation unit and an edge of the node. The determined policy can be the same as or different from the determined allocation policy in step 610. The second subgraph 420 is still used as an example. Node H is not previously stored in any calculation unit, and node H and an edge of node H in the calculation unit are included, based on the determined allocation policy, in the graph data segment that is of the second subgraph 420 and that is stored in calculation unit 2 in FIG. 7. Node G and an edge of node G in the second subgraph 420 are included, based on the determined allocation policy, in the graph data segment that is of the second subgraph 420 and that is stored in calculation unit 4 in FIG. 7.

Figure 8:
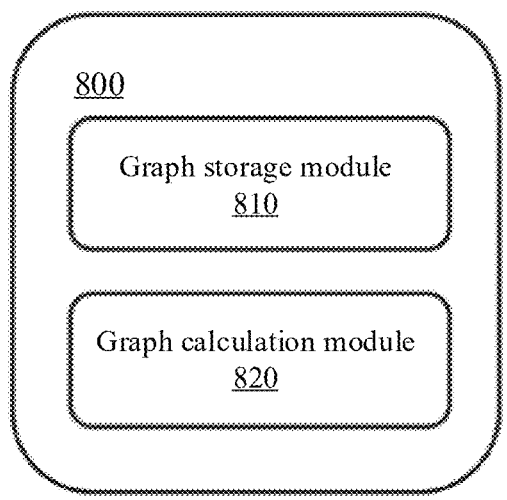
FIG. 8 is an example module diagram illustrating a flow graph calculation and storage system according to some implementations of the present specification.

FIG. 8 is an example module diagram illustrating a flow graph calculation and storage system according to some implementations of the present specification.

In some implementations, the flow graph calculation and storage system 800 can include a graph storage module 810 and a graph calculation module 820.

The graph storage module 810 can be configured to: in a round of processing, obtain a graph data segment of a current subgraph based on newly added flow information in a current time period and store the graph data segment, so as to implement distributed storage of the current subgraph in collaboration with another calculation unit.

For more content of distributed storage of the current subgraph, references can be made to step 210 and related descriptions of step 210. Details are omitted herein for simplicity.

The graph calculation module 820 can be configured to: in a round of processing, for a node in the graph data segment of the current subgraph, obtain a flow message of data corresponding to an ingress edge of the node from a source node on the ingress edge and store the flow message, where the flow message includes a source link of the data.

For more content of the flow message, references can be made to step 220 and related descriptions of step 220. Details are omitted herein for simplicity.

In some implementations, in a round of processing, the graph calculation module 820 is further configured to: for a node in the graph data segment of the current subgraph, update a flow message of the node based on an egress edge of the node, where the updating further includes modifying data corresponding to one or more flow messages in the node, or deleting one or more flow messages in the node.

In some implementations, in a round of processing, the graph storage module 810 is further configured to: in response to that the current time period is a first time period, obtain the graph data segment of the current subgraph based on a determined allocation policy and store the graph data segment; and in response to that the current time period is not the first time period, include, in the graph data segment of the current subgraph, an edge of the node in the current subgraph that has been stored in the calculation unit; and determine, based on the determined allocation policy, whether to include, in the graph data segment of the current subgraph, a node in the current subgraph that has not been stored in any calculation unit and an edge of the node.

It should be understood that the flow graph calculation and storage system 800 and the modules of the system shown in FIG. 8 can be implemented in various manners. For example, in some implementations, the apparatus and the modules of the apparatus can be implemented by hardware, software, or a combination of software and hardware. The hardware part can be implemented by using dedicated logic. The software part can be stored in a memory and executed by an appropriate instruction execution apparatus, such as a microprocessor or specially designed hardware. A person skilled in the art can understand that the above method and apparatus can be implemented by using computer-executable instructions and/or control code included in the processor, for example, such code is provided in a carrier medium such as a disk, a CD, or a DVD-ROM, a programmable memory such as a read-only memory (firmware), or a data carrier such as an optical or electronic signal carrier. The apparatus and the modules of the apparatus in the present specification can be implemented not only by a hardware circuit of an ultra large scale integrated circuit or gate array, a semiconductor such as a logic chip or a transistor, or a programmable hardware device such as a field programmable gate array or a programmable logic device, but also by software executed by various types of processors, or can be implemented by a combination of the hardware circuit and the software (for example, firmware).

It should be noted that the above descriptions of the flow graph calculation and storage system 800 and the modules are merely used for convenient description, and cannot limit the present specification to the scope of the enumerated implementations. It can be understood that, after understanding the principle of the apparatus, a person skilled in the art can randomly combine the modules without departing from the principle, or form a sub-apparatus to be connected to another module. For example, the graph calculation module 820 and the graph storage module 810 in FIG. 8 can be the same module. For another example, the modules in the system can be located on the same server, or can respectively belong to different servers. Such variations fall within the protection scope of the present specification.

Example implementations of the present invention are described above, which do not limit the scope of the specification. Other implementations not specifically described herein also fall within the scope of the specification. In some cases, actions or steps described in the claims can be performed in an order different from that in the implementations and the desired results can still be achieved. In addition, the process depicted in the accompanying drawings does not necessarily need a particular execution order to achieve the desired results. In some implementations, multi-tasking and concurrent processing are feasible or can be advantageous.

Beneficial effects that are possibly brought by the implementations of the present specification include but are not limited to: (1) A flow graph is split into a plurality of subgraphs for distributed storage, so that a bottleneck of a calculation device is effectively avoided. (2) A flow message including a source link of data is updated, so that information generated in a flow process can be completely retained and can be traced easily. (3) An edge of a node in a subgraph that has been stored in a calculation unit is included in a graph data segment of a current subgraph, so that an association relationship in a flow graph is retained.

It should be noted that different beneficial effects can be generated in different implementations. In different implementations, a beneficial effect that can be generated can be any one of or a combination of several of the above beneficial effect, or can be any other beneficial effect that can be obtained.

Basic concepts have been described above. Clearly, for a person skilled in the art, the above detailed disclosure is merely an example, but does not constitute a limitation on the present specification. Although not explicitly stated herein, a person skilled in the art can make various modifications, improvements, and amendments to the present specification. Such modifications, improvements, and amendments are suggested in the present specification. Therefore, such modifications, improvements, and amendments still fall within the spirit and scope of the example implementations of the present specification.

In addition, specific words are used in the present specification to describe the implementations of the present specification. For example, "an implementation", "an implementation", and/or "some implementations" mean a feature, structure, or characteristic related to at least an implementation of the present specification. Therefore, it should be emphasized and noted that "an implementation", "an implementation" or "an alternative implementation" mentioned twice or more times in different locations in the present specification does not necessarily refer to the same implementation. In addition, some features, structures, or characteristics in one or more implementations of the present specification can be appropriately combined.

In addition, unless explicitly stated in the claims, the order of the processing elements and sequences, the use of numbers and letters, or the use of other names described in the present specification is not intended to limit the order of the procedures and methods in the present specification. Although some implementations of the present invention that are currently considered useful are discussed in various examples in the above disclosure, it should be understood that such details are merely used for illustrative purposes. The appended claims are not limited to the implementations described herein, and instead, the claims are intended to cover all modifications and equivalent combinations that conform to the contents and scope of the implementations of the present specification. For example, although the system components described above can be implemented by a hardware device, the system components can also be implemented only by a software solution, for example, installing the described system on an existing server or mobile device.

Similarly, it should be noted that, to simplify the description disclosed in the present specification to help understand one or more implementations of the present invention, in the above description of the implementations of the present specification, a plurality of features are sometimes incorporated into an implementation or accompanying drawing or descriptions thereof. However, this disclosure method does not mean that features required by the object in the present specification are more than the features mentioned in the claims. Actually, the features of the implementations are less than all features of an individual implementation disclosed above.

Numbers describing the composition and attributes are used in some implementations. It should be understood that such numbers used for the description of the implementations are modified in some examples by modifiers such as "about", "approximately", or "generally". Unless otherwise stated, "about", "approximately", or "generally" indicates that the number allows a change of ±20%. Correspondingly, in some implementations, value parameters used in the present specification and claims are approximations, and the approximations can change based on features required by some implementations. In some implementations, the value parameters should take into account the specified significant digits and use a general digit retention method. Although in some implementations of the present specification, value domains and parameters used to determine the ranges of the implementations are approximations, in specific implementations, such values are set as precisely as possible in a feasible range.

Each patent, patent application, and patent application publication, and other materials, such as articles, books, instructions, publications, or documents that are referenced by the present specification are incorporated into the present specification herein by reference in its entirety, except for the history application documents that are inconsistent with or conflict with the content of the present specification, and the documents limiting a widest scope of the claims of the present specification (the documents currently or subsequently attached to the present specification). It should be noted that, if the description, definition, and/or use of a term in the auxiliary material of the present specification is inconsistent or conflicts with the content of the present specification, the description, definition, and/or use of the term in the present specification shall prevail.

Finally, it should be understood that the implementations described in the present specification are merely used to describe the principles of the implementations of the present specification. Other variations can all fall within the scope of the present specification. Therefore, as an example rather than a limitation, alternative configurations of the implementations of the present specification can be considered to be consistent with the teachings of the present specification. Correspondingly, the implementations of the present specification are not limited to the implementations explicitly introduced and described in the present specification.

What is claimed is:

1. A method for calculating and storing a flow graph, the flow graph comprising nodes and edges, with the edges indicating a flow direction of data flowing between the nodes, the method being performed by a first calculation unit of a plurality of calculation units configured to collectively store the flow graph in a distributed manner, and comprising one or more rounds of processing respectively corresponding to one or more time periods of data flow, and a round of processing comprising:
    obtaining a first graph data segment of a current subgraph based on newly added flow information in a current time period and storing the first graph data segment, so as to implement distributed storage of the current subgraph in collaboration with a second calculation unit of the plurality of calculation units; and
    for a node in the first graph data segment of the current subgraph, obtaining a flow message of data corresponding to an ingress edge of the node from a source node on the ingress edge and storing the flow message, wherein the flow message includes a source link of the data.

2. The method according to claim 1, further comprising:
    for a node in the first graph data segment of the current subgraph, updating a flow message of the node based on an egress edge of the node, wherein the updating includes modifying data corresponding to one or more flow messages of the node, or deleting one or more flow messages of the node.

3. The method according to claim 2, wherein the modifying the data corresponding to the one or more flow messages of the node comprises: decreasing an amount of data corresponding to the one or more flow messages of the node.

4. The method according to claim 1, further comprising:
    for a node in the first graph data segment of the current subgraph, generating a flow message of data corresponding to an egress edge of the node based on the egress edge, for a destination node on the egress edge to obtain the flow message corresponding to the egress edge.

5. The method according to claim 1, wherein the first graph data segment includes a part of nodes of the current subgraph and edges of the part of nodes, and the obtaining the first graph data segment of the current subgraph based on the newly added flow information in the current time period and storing the first graph data segment include:
    in response to that the current time period is a first time period, obtaining the first graph data segment of the current subgraph based on a determined allocation policy and storing the first graph data segment; and
    in response to that the current time period is not the first time period,
        including, in the first graph data segment of the current subgraph, an edge of a node in the current subgraph that has been stored in the first calculation unit; and
        determining, based on the determined allocation policy, whether to include, in the first graph data segment of the current subgraph, a node in the current subgraph that has not been stored in any calculation unit and an edge of the node.

6. The method according to claim 1, wherein attribute information of the edges includes data flow time, the data includes resource data, and the node corresponds to an account for resource storage.

7. The method of claim 1, wherein a second graph data segment of the current subgraph stored in the second calculation unit is different from the first graph data segment in the first calculation unit.

8. A computing system having one or more processors and one or more storage devices, the one or more storage device, individually or collectively, having computer executable instructions stored thereon, which when executed by the one or more processors, enable the one or more processors to, individually or collectively, implement a first calculation unit to process a flow graph, the flow graph including nodes and edges, with the edges indicating a flow direction of data flowing between the nodes, the processing the flow graph includes one or more rounds of processing respectively corresponding to one or more time periods of data flow, and a round of processing comprising:
    obtaining a first graph data segment of a current subgraph based on newly added flow information in a current time period and storing the first graph data segment, so as to implement distributed storage of the current subgraph in collaboration with a second calculation unit; and
    for a node in the first graph data segment of the current subgraph, obtaining a flow message of data corresponding to an ingress edge of the node from a source node on the ingress edge and storing the flow message, wherein the flow message includes a source link of the data.

9. The computing system according to claim 8, wherein a round of processing further comprises:
    for a node in the first graph data segment of the current subgraph, updating a flow message of the node based on an egress edge of the node, wherein the updating includes modifying data corresponding to one or more flow messages of the node, or deleting one or more flow messages of the node.

10. The computing system according to claim 9, wherein the modifying the data corresponding to the one or more flow messages of the node comprises: decreasing an amount of data corresponding to the one or more flow messages of the node.

11. The computing system according to claim 8, wherein a round of processing further comprises:
for a node in the first graph data segment of the current subgraph, generating a flow message of data corresponding to an egress edge of the node based on the egress edge, for a destination node on the egress edge to obtain the flow message corresponding to the egress edge.

12. The computing system according to claim 8, wherein the first graph data segment includes a part of nodes of the current subgraph and edges of the part of nodes, and the obtaining the first graph data segment of the current subgraph based on the newly added flow information in the current time period and storing the first graph data segment include:
in response to that the current time period is a first time period, obtaining the first graph data segment of the current subgraph based on a determined allocation policy and storing the first graph data segment; and
in response to that the current time period is not the first time period,
including, in the first graph data segment of the current subgraph, an edge of a node in the current subgraph that has been stored in the first calculation unit; and
determining, based on the determined allocation policy, whether to include, in the first graph data segment of the current subgraph, a node in the current subgraph that has not been stored in any calculation unit and an edge of the node.

13. The computing system according to claim 8, wherein attribute information of the edges includes data flow time, the data includes resource data, and the node corresponds to an account for resource storage.

14. The computing system of claim 8, wherein a second graph data segment of the current subgraph stored in the second calculation unit is different from the first graph data segment in the first calculation unit.

15. A non-transitory storage medium having computer executable instructions stored thereon, the computer executable instructions, when executed by one or more processors, enabling the one or more processors to, individually or collectively, implement a first calculation unit to process a flow graph, the flow graph including nodes and edges, with the edges indicating a flow direction of data flowing between the nodes, the processing the flow graph includes one or more rounds of processing respectively corresponding to one or more time periods of data flow, and a round of processing comprising:
obtaining a first graph data segment of a current subgraph based on newly added flow information in a current time period and storing the first graph data segment, so as to implement distributed storage of the current subgraph in collaboration with a second calculation unit; and
for a node in the first graph data segment of the current subgraph, obtaining a flow message of data corresponding to an ingress edge of the node from a source node on the ingress edge and storing the flow message, wherein the flow message includes a source link of the data.

16. The non-transitory storage medium according to claim 15, wherein a round of processing further comprises:
for a node in the first graph data segment of the current subgraph, updating a flow message of the node based on an egress edge of the node, wherein the updating includes modifying data corresponding to one or more flow messages of the node, or deleting one or more flow messages of the node.

17. The non-transitory storage medium according to claim 16, wherein the modifying the data corresponding to the one or more flow messages of the node comprises: decreasing an amount of data corresponding to the one or more flow messages of the node.

18. The non-transitory storage medium according to claim 15, wherein a round of processing further comprises:
for a node in the first graph data segment of the current subgraph, generating a flow message of data corresponding to an egress edge of the node based on the egress edge, for a destination node on the egress edge to obtain the flow message corresponding to the egress edge.

19. The non-transitory storage medium according to claim 15, wherein the first graph data segment includes a part of nodes of the current subgraph and edges of the part of nodes, and the obtaining the first graph data segment of the current subgraph based on the newly added flow information in the current time period and storing the first graph data segment include:
in response to that the current time period is a first time period, obtaining the first graph data segment of the current subgraph based on a determined allocation policy and storing the first graph data segment; and
in response to that the current time period is not the first time period,
including, in the first graph data segment of the current subgraph, an edge of a node in the current subgraph that has been stored in the first calculation unit; and
determining, based on the determined allocation policy, whether to include, in the first graph data segment of the current subgraph, a node in the current subgraph that has not been stored in any calculation unit and an edge of the node.

20. The non-transitory storage medium of claim 15, wherein a second graph data segment of the current subgraph stored in the second calculation unit is different from the first graph data segment in the first calculation unit.

* * * * *